(12) United States Patent
Parastar et al.

(10) Patent No.: US 10,443,750 B2
(45) Date of Patent: Oct. 15, 2019

(54) PILOT VALVE ARRANGEMENT

(71) Applicant: DANFOSS A/S, Nordborg (DK)

(72) Inventors: Behzad Parastar, Kolding (DK);
Detlef Matzen, Aabenraa (DK); Klaus Halldorsson, Kolding (DK); Simon Ahrens Lassen, Kolding (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 15/743,322

(22) PCT Filed: May 26, 2016

(86) PCT No.: PCT/EP2016/061872
§ 371 (c)(1),
(2) Date: Jan. 10, 2018

(87) PCT Pub. No.: WO2017/028974
PCT Pub. Date: Feb. 23, 2017

(65) Prior Publication Data
US 2018/0202566 A1  Jul. 19, 2018

(30) Foreign Application Priority Data

Aug. 18, 2015 (EP) ..................................... 15181396

(51) Int. Cl.
*F16K 27/02* (2006.01)
*F16K 31/08* (2006.01)
(Continued)

(52) U.S. Cl.
CPC ............ *F16K 17/06* (2013.01); *F16K 15/025* (2013.01); *F16K 27/02* (2013.01); *F16K 27/029* (2013.01);
(Continued)

(58) Field of Classification Search
CPC ........ F16K 17/06; F16K 31/10; F16K 31/088; F16K 15/025; F16K 31/04; F16K 27/02; F16K 27/029
(Continued)

(56) References Cited

U.S. PATENT DOCUMENTS 4,548,233 A    10/1985  Wölfges
4,948,091 A *   8/1990  Satoh ........................ F16K 1/12
                                                        251/129.11

(Continued)

FOREIGN PATENT DOCUMENTS

DE    3315222 A1   10/1984
DE    4011593 A1   10/1991
(Continued)

OTHER PUBLICATIONS

International Search Report for Serial No. PCT/EP2016/061872 dated Aug. 22, 2016.
(Continued)

*Primary Examiner* — Matthew W Jellett
(74) *Attorney, Agent, or Firm* — McCormick, Paulding & Huber LLP

(57) ABSTRACT

The invention relates to a pilot valve arrangement (1) comprising a pilot valve device (2) which comprises a pilot valve element (13), a pilot valve seat (14) cooperating with the pilot valve element (13) and a presetting mechanism for presetting an opening pressure of the pilot valve element (13), the pilot valve arrangement (1) further comprising a presetting mechanism actuating device (3) which comprises an actuator element (17) adapted to create an actuating force in order to actuate the presetting mechanism in the pilot valve device so as to preset the opening pressure. According to the invention, the pilot valve arrangement (1) comprises a contactless force coupling arrangement adapted to transfer (Continued)

the actuating force from the presetting mechanism actuating device (3) to the pilot valve device (2). An inventive pilot valve device (2) is disclosed and claimed as well. The invention allows to improve maintenance and safety concerning the devices mentioned above.

20 Claims, 6 Drawing Sheets

(51) Int. Cl.
F16K 17/06 (2006.01)
F16K 31/10 (2006.01)
F16K 15/02 (2006.01)
F16K 31/04 (2006.01)

(52) U.S. Cl.
CPC ............ *F16K 31/04* (2013.01); *F16K 31/088* (2013.01); *F16K 31/10* (2013.01)

(58) Field of Classification Search
USPC ........... 251/30.02, 30.05, 65, 129.11, 129.12
See application file for complete search history.

(56) References Cited

U.S. PATENT DOCUMENTS

| | | | |
|---|---|---|---|
| 5,954,311 A | 9/1999 | Thorpe | |
| 6,997,430 B2 * | 2/2006 | Denning | F16K 31/047 251/129.11 |
| 7,325,780 B2 * | 2/2008 | Arai | F16K 31/04 251/129.11 |
| 7,669,609 B2 | 3/2010 | Hansen, III et al. | |
| 8,297,315 B2 * | 10/2012 | Esveldt | F16K 1/12 137/625.3 |
| 2002/0189693 A1 * | 12/2002 | Berto | F16K 31/04 137/628 |
| 2012/0211687 A1 | 8/2012 | Benjey et al. | |

FOREIGN PATENT DOCUMENTS

| | | |
|---|---|---|
| EP | 1965113 A1 | 9/2008 |
| FR | 2947606 A1 | 1/2011 |

OTHER PUBLICATIONS

"Motor operated valves and Actuators: Type ICM and ICAD," Data Sheet, pp. 1-84 (Jun. 2017).
"Pilot Controlled Servo Valves—ICS Solenoid Valves and Pressure Regulating Valves," www.danfoss.us, pp. 1-50.

\* cited by examiner

US 10,443,750 B2

PILOT VALVE ARRANGEMENT

CROSS-REFERENCE TO RELATED APPLICATIONS

This application is a National Stage application of International Patent Application No. PCT/EP2016/061872, filed on May 26, 2016, which claims priority to European Patent Application No. EP15181396.1, filed on Aug. 18, 2015, each of which is hereby incorporated by reference in its entirety.

TECHNICAL FIELD

The present invention relates to a pilot valve arrangement comprising a pilot valve device which comprises a pilot valve element, a pilot valve seat cooperating with the pilot valve element, and a presetting mechanism for presetting an opening pressure of the pilot valve element, the pilot valve arrangement further comprising a presetting mechanism actuating device which comprises an actuator element adapted to create an actuating force in order to actuate the presetting mechanism in the pilot valve device so as to preset the opening pressure. Furthermore, the invention relates to the pilot valve device comprising the pilot valve element, the pilot valve seat cooperating with the pilot valve element, and the presetting mechanism for presetting the opening pressure of the pilot valve element.

BACKGROUND

U.S. Pat. No. 7,669,609 B2 discloses a universal valve for refrigeration systems. In one embodiment the universal valve comprises an adapter plate configured to cause the universal valve to function with a stepping motor connected to a pilot regulator stem for pressure setting alterations. As the motor rotates, it can control a regulator pressure setting.

SUMMARY

It is an object of the invention to allow an improved serviceability of the pilot valve arrangement.

The object of the invention is solved by the pilot valve arrangement as described in the outset in that the pilot valve arrangement comprises a contactless force coupling arrangement adapted to transfer the actuating force from the presetting mechanism actuating device to the pilot valve device.

By that, the improved serviceability of the pilot valve arrangement is established. This may for example allow for a quicker or safer maintenance of the pilot valve arrangement.

In the present context, presetting the opening pressure means that the presetting mechanism is adapted to adjustably predetermine an opening force to be provided by a pilot fluid in order to open the pilot valve element. Thus, when the predetermined opening pressure is surpassed by the pilot fluid, the pilot valve element will allow the pilot fluid to pass the pilot valve device.

It is preferred that the actuating force is a torque and the contactless force coupling arrangement comprises cooperating magnets in order to transfer the torque over an air gap. Thus, the torque preferably is transferred over the air gap present between the cooperating magnets. This allows easy and comfortable torque transfer from the presetting mechanism actuating device to the pilot valve device while no mechanical contact such as a friction fit or mechanical interlocking is necessary to transfer the torque.

In a preferred embodiment of the invention the presetting mechanism actuating device comprises a rotatable axis drivable by the actuator element, the presetting mechanism comprises a rotatable spindle drivable by the axis, and the contactless force coupling arrangement is adapted to transfer the actuating force from the axis to the spindle so as to rotate the spindle in order to actuate the presetting mechanism. Thus, although in preferred embodiments of the invention, the axis and the spindle are spaced apart from each other, by an air gap, for example, the spindle can be rotated by the axis due to the contactless force coupling arrangement. This allows actuating the presetting mechanism despite no mechanical link connecting the axis and the spindle.

Preferably the spindle comprises a first spindle end and the axis provides a cavity adapted to house the first spindle end in order to transfer the actuating force from the actuator element to the presetting mechanism via the contactless force coupling arrangement. In preferred embodiments, the cavity at least partially surrounds a circumferential line of the first spindle end. Thus, the cavity may have a hat-like design. In this case, it is preferred that the air gap is provided between an inner surface of the cavity and the spindle.

It is preferred that the first spindle end comprises one or more spindle magnets being rotationally fixed relative to the spindle, the axis comprises a first axis end, the first axis end comprises one or more axis magnets being rotationally fixed relatively to the axis, the spindle magnet being a first permanent magnet and the axis magnet being a second permanent magnet, the first permanent magnet and the second permanent magnet together being cooperating magnets in order to exert a magnetic force on each other so as to allow the axis to rotate the spindle. It is preferred that the one or more spindle magnets are arranged at the circumferential line of the first spindle end. It is furthermore preferred that the one or more axis magnets are arranged on the inner surface of the cavity. Furthermore, it is preferred that there is an air gap between the one or more spindle magnets and the one or more axis magnets. Having a magnetic force between the cooperating magnets allows for transferring the actuating force, preferably the torque, between the axis and the spindle in a contactless manner. Thus, although there is no direct mechanical contact between the axis and the spindle, the actuating force can be transferred to the presetting mechanism.

Preferably the pilot valve device comprises a bearing in order to facilitate rotation of the spindle magnet. As the one or more spindle magnets are preferably rotationally fixed relative to the spindle such a bearing will also facilitate rotation of the spindle itself. A preferred bearing is a ball bearing. Another preferred bearing is a sleeve bearing.

Preferably, the pilot valve element is a membrane, the membrane being biased so as to keep pilot valve element in contact with the pilot valve seat, the presetting mechanism influencing the biasing of the membrane by means of the actuating force and by this presetting the opening pressure. In an even more preferred embodiment the pilot valve element is a double membrane. A higher number of membranes is present in some embodiments though. It is then preferred that three or four membranes are provided. This allows for an increased safety. When the pilot fluid surpasses the opening pressure, the membrane will lift off the pilot valve seat and will allow passing of the pilot fluid.

In a preferred embodiment of the invention the presetting mechanism further comprises a nut, the nut being drivable by means of the actuating force, and a spring, the spring biasing the membrane, and the nut being adapted to pretension a spring depending on a position of the nut. Preferably, the nut coaxially surrounds a spindle. It is preferred that the nut and the spindle comprise cooperating threads so that the nut can move along the spindle when the spindle rotates. To facilitate this, it is preferred that the nut has a nose that assures a movement of the nut along the spindle when the spindle is rotated. When the actuator element drives the spindle via the axis, the nut will change its position along the spindle and thus change the pretension of the spring. By this, the opening pressure of the pilot valve element can be preset and adjusted.

In a preferred embodiment of the invention the spring is a coil spring and the spring comprises a first spring end and a second spring end, the first spring end being seated on the nut and the second spring end being seated adjacent to the membrane. Accordingly, it is preferred that the spring coaxially surrounds the spindle. In some embodiments, the spring is seated directly on the membrane. In other embodiments of the invention the spring is seated on an intermediate element, although still adjacent to the membrane, and the intermediate element transfers the pressure to the membrane.

Preferably the actuator element is a motor. In some embodiments the actuator element is an electric motor. Then more preferred electric motors are a continuous motor or a stepper motor. Depending on the intended power source of the motor, the presetting mechanism actuating device may comprise a battery seating or a power socket for attaching a power cable. Furthermore, the presetting mechanism actuating device may comprise one or more buttons and a display to set the actuator element.

It is preferred that the pilot valve device and the presetting mechanism actuating device comprise a fixing arrangement for fixing the pilot valve device and the presetting mechanism actuating device to each other. Preferably, the fixing arrangement allows for removably fixing the pilot valve device and the actuating device to each other. As the pilot valve device and the presetting mechanism actuating device transfer the force via the contactless coupling arrangement, having the fixing arrangement which allows separating the pilot valve device from the presetting mechanism actuating device allows easy replacement of the presetting mechanism actuating device, for example in case of malfunction. Then, the presetting mechanism actuating device may easily be replaced or the presetting mechanism can even be actuated by a free magnet in case the contactless force coupling arrangement makes use of cooperating magnets. Thus, improved maintenance and increased safety become possible. A preferred fixing arrangement is a threaded connection.

In a preferred embodiment, the contactless force coupling arrangement is hermetically sealed on the side of the pilot valve device. This embodiment is very much preferred when the pilot valve device and the presetting mechanism actuating device are fixed to each other removably. When the pilot valve device is hermetically sealed with respect to the contactless force coupling arrangement no pilot fluid can unexpectedly leave the valve nor can any external substance enter the valve through the contactless force coupling arrangement. Nonetheless, the transfer of force is still possible. Thus, it can be of large advantage for maintenance and safety reasons to combine the contactless force coupling arrangement which is hermetically sealed on the side of the pilot valve device and the fixing arrangement which allows for removably fixing the pilot valve device and the presetting mechanism actuating device to each other. Thus, for example, the presetting mechanism comprising the spindle, the nut, the spring and the membrane may be hermetically housed inside the pilot valve device.

In preferred embodiments, the pilot valve device has a pilot fluid inlet, a pilot fluid outlet, and a main valve connection arrangement in order to connect the pilot valve device to a main valve device such as to control the opening of the main valve device by supplying a pilot fluid to the main valve device passing the pilot valve element and through the pilot fluid outlet. It is preferred that the pilot fluid enters the pilot valve device through the pilot fluid inlet. The described design of the pilot valve device is well tested and thus allows a good control of the opening of the main valve device depending on the pilot fluid passing through the pilot valve element.

The object of the invention is furthermore solved by the pilot valve device as described in the outset, the presetting mechanism being adapted to receive the actuating force via the contactless force coupling arrangement. Preferred embodiments of this pilot valve device were already described above in view of the pilot valve arrangement. The same advantages may be reached with the pilot valve device according to the invention.

BRIEF DESCRIPTION OF THE DRAWINGS

In the following a detailed description of embodiments of the invention is given. Therefore, reference is made to the attached figures, in which.

Reference signs are introduced into the detailed description in order to improve readability of the claims. The reference signs are in no way meant to be limiting.

DETAILED DESCRIPTION

Figure 1:
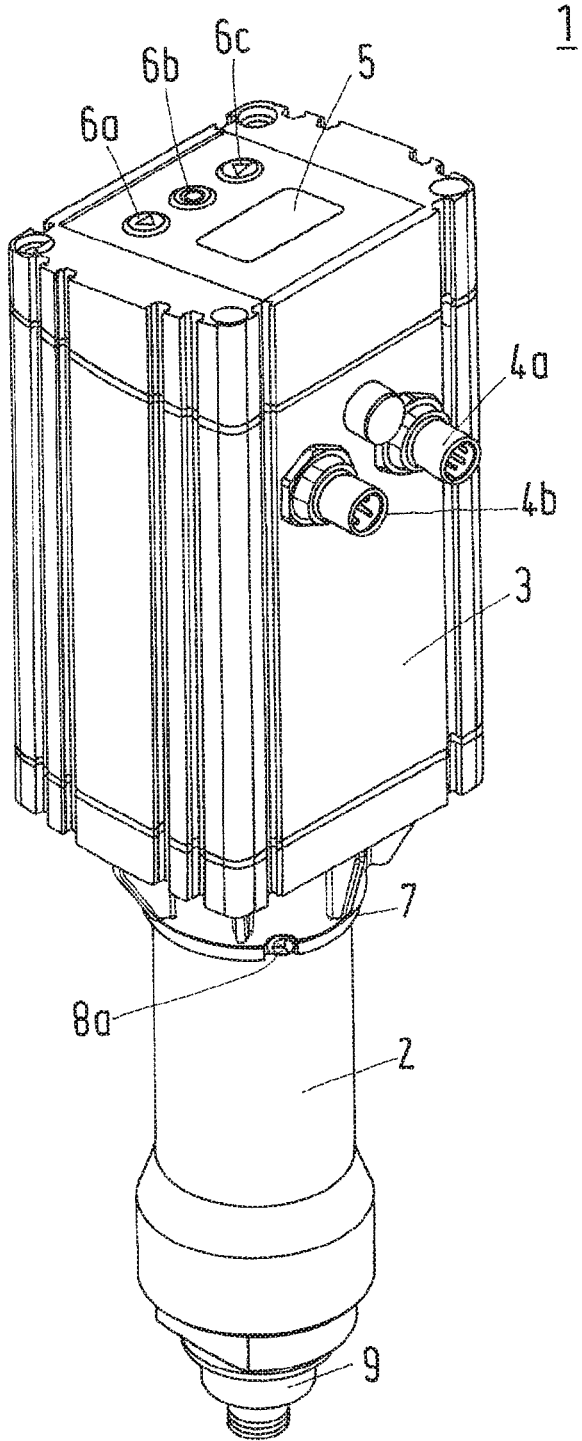
FIG. 1 shows a perspective view of the pilot valve arrangement according to an embodiment of the invention.

FIG. 1 shows the perspective view of the pilot valve arrangement 1 according to an embodiment of the invention. The pilot valve arrangement 1 comprises the pilot valve device 2 and the presetting mechanism actuating device 3.

The presetting mechanism actuating device 3 comprises sockets 4a, 4b for connecting data cables and power cables to the presetting mechanism actuating device 3. In order to control the presetting mechanism actuating device 3, the presetting mechanism actuating device 3 comprises the display 5 and buttons 6a, 6b, 6c. This way, settings of the presetting mechanism actuating device 3 may be read out or changed.

The pilot valve device 2 and the presetting mechanism actuating device 3 comprise the fixing arrangement 7 for fixing the pilot valve device 2 and the presetting mechanism actuating device 3 to each other. In the shown embodiment, the fixing arrangement 7 is adapted to fix the pilot valve device 2 and the presetting mechanism actuating device 3 removably to each other. To achieve this, screws 8a, 8b are present at the fixing arrangement 7. Thus, the pilot valve device 2 and the presetting mechanism actuating device 3 are separate parts which may be removed from each other by removing the screws 8a, 8b and then pulling off presetting mechanism actuating device 3 from the pilot valve device 2. Furthermore, the pilot valve device 2 comprises a main valve connection arrangement 9. In the shown embodiment this main valve connection arrangement 9 is a keyed connection to ensure proper connectability.

Figure 2:
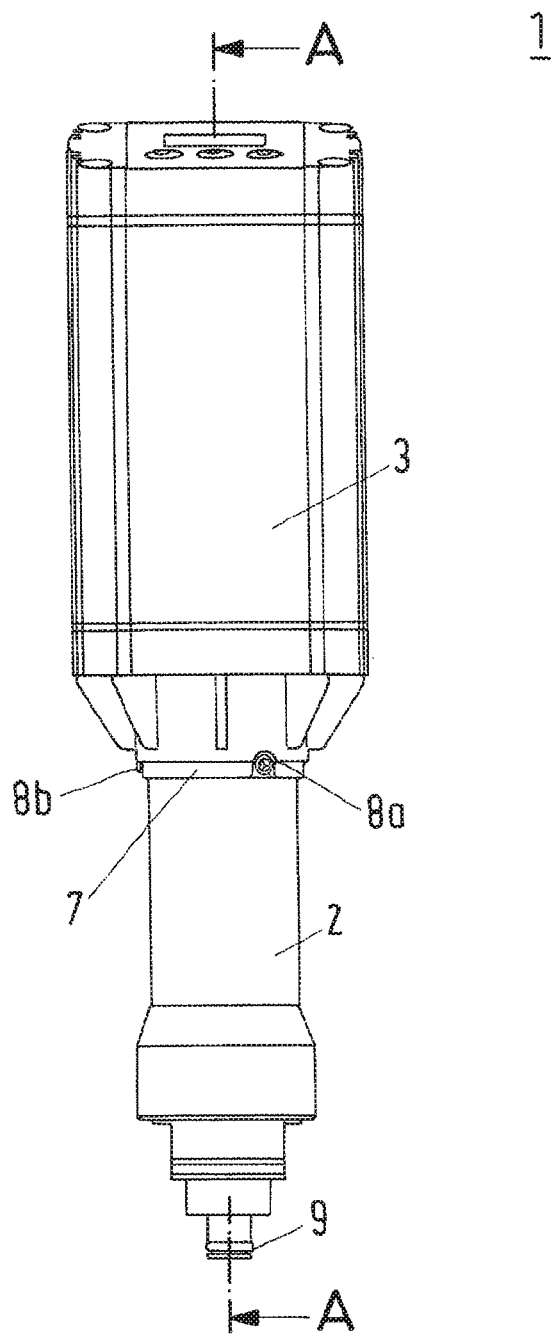
FIG. 2 shows a side view of the pilot valve arrangement according to an embodiment of the invention.

FIG. 2 shows a side view of the pilot valve arrangement 1. Again it can be seen that the pilot valve device 2 and the presetting mechanism actuating device 3 are fixed to each other via the fixing arrangement 7 which makes use of screws 8a, 8b for fixing the pilot valve device 2 and the presetting mechanism actuating device 3 removably to each other. As laid out earlier, this allows for quick and safe arrangement of the presetting mechanism actuating device 3 in case of malfunction.

Figure 3:
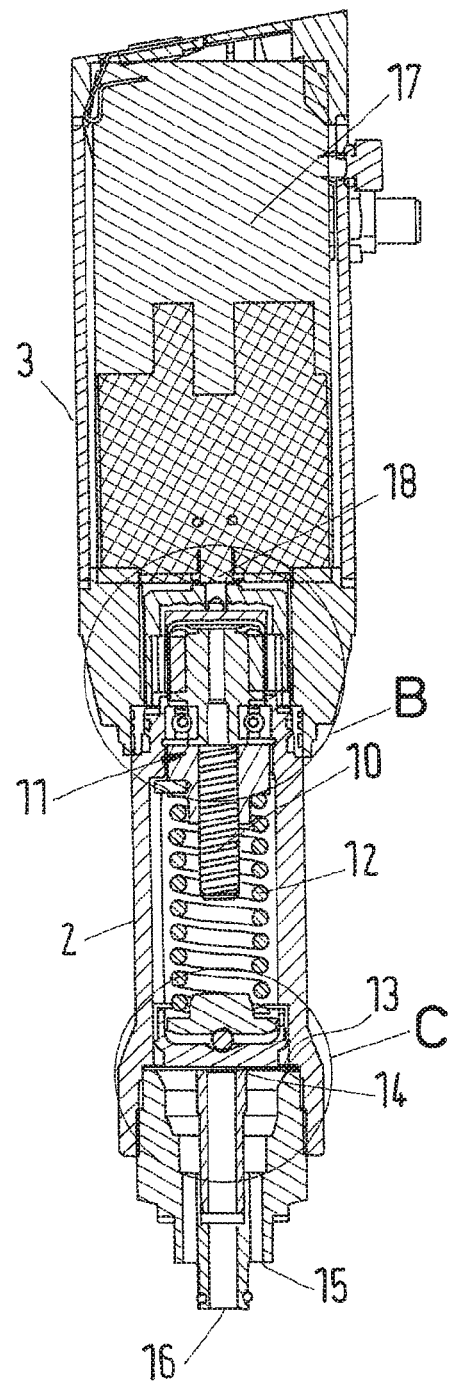
FIG. 3 shows a longitudinal section of the pilot valve arrangement according to an embodiment of the invention.

FIG. 3 now shows a longitudinal section of the view given in FIG. 2. As shown, the pilot valve device 2 comprises the presetting mechanism comprising the spindle 10, the nut 11 and the spring 12. The presetting mechanism is adapted for presetting the opening pressure of the pilot valve element 13 which is also comprised in the pilot valve device 2. The pilot valve element 13 in this embodiment is the membrane, the membrane being biased so as to keep the pilot valve element 13 in contact with the pilot valve seat 14, the presetting mechanism influencing the biasing of the membrane. Furthermore, it is shown that the pilot valve device 2 comprises the pilot fluid inlet 15 and the pilot fluid outlet 16 which are arranged adjacent to the main valve connection arrangement 9.

FIG. 3 also shows that the presetting mechanism actuating device 3 comprises the actuator element 17 adapted to create the actuating force in order to actuate the presetting mechanism in the pilot valve device 2 so as to preset the opening pressure. In this embodiment the actuator element 17 is the motor, more specifically the stepper motor. This allows a step by step presetting, thus adjustment, of the opening pressure of the pilot valve element 13. The presetting mechanism actuating device 3 furthermore comprises a rotatable axis 18 drivable by the actuator element 17. The contactless force coupling arrangement is adapted to transfer the actuating force from the axis 18 to the spindle 10 so as to rotate the spindle 10 in order to actuate the presetting mechanism. Thus, in the present embodiment the actuating force is the rotational torque.

Figure 4:
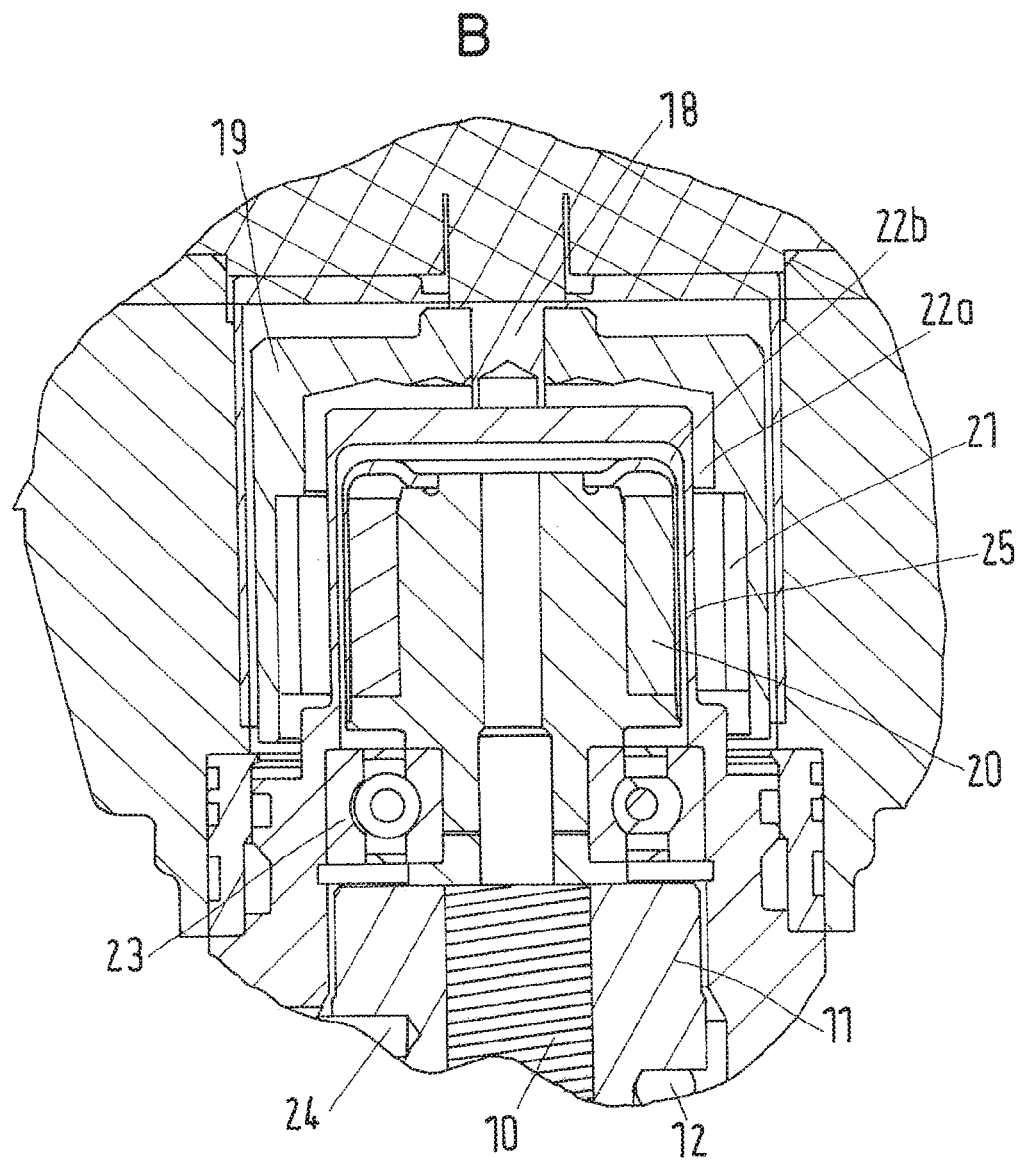
FIG. 4 shows a detailed view of the contactless force coupling arrangement present in the pilot valve arrangement according to the invention.

The design of the contactless force coupling arrangement is shown in more detail in FIG. 4. As can be seen, the spindle 10 comprises a first spindle end and the axis 18 provides the cavity 19 adapted to house the first spindle end in order to transfer the actuating force from the actuator element 17 to the presetting mechanism via the contactless force coupling arrangement. Thus, the contactless force coupling arrangement is adapted to transfer the actuating force from the axis 18 to the spindle 10 so as to rotate the spindle in order to actuate the presetting mechanism.

The contactless force coupling arrangement comprises cooperating magnets in order to transfer the torque over the air gap 22a, 22b. More specifically, the first spindle end comprises one or more spindle magnets being rotationally fixed relative to the spindle 10, the axis 18 comprises the first axis end, the first axis end comprises one or more axis magnets being rotationally fixed relative to the axis, the spindle magnet in this case being the first permanent magnet 20 and the axis magnet being the second permanent magnet 21. The first permanent magnet 20 and the second permanent magnet 21 together are cooperating magnets in order to exert the magnetic force on each other so as to allow the axis 18 to rotate the spindle 10. As depicted, the shown embodiment the first permanent magnet 20 is arranged on the circumferential line of the spindle 10 while the second permanent magnet 21 is arranged on the inner surface of the cavity 19. As the first permanent magnet 20 and the second permanent magnet 21 are arranged such that their respective magnetic fields interlock with each other the magnetic force bridging the air gap 22a, 22b will result in a forced rotation of the spindle 10 once the axis 18 is driven by the presetting mechanism actuating device 3. In order to enhance rotation of the spindle 10 the first spindle end comprising the first permanent magnet 20 is seated on the bearing 23. The bearing 23 is seated between the first spindle end and the nut 11. In the present embodiment the bearing 23 is the ball bearing. As can be seen, the nut 11 comprises the nose 24. Nose 24 guarantees that nut 11 will start to move along the spindle 10 when spindle 10 is actuated by the actuator element 17. This is due to the fact that nut 11 and spindle 10 are connected to each other via cooperating threads, nut 11 coaxially surrounding spindle 10.

As can be seen in FIG. 3 and FIG. 4, the spring 12 is the coil spring and the spring 12 comprises the first spring end and the second spring end, the first spring end being seated on the nut 11 and the second spring end being seated adjacent to the pilot valve element 13, thus in this case the membrane. The spring 12 coaxially surrounds the spindle 10. The spring 12 is biasing in the membrane and the nut 11 is adapted to pretension the spring 12 depending on the position of the nut 11.

Accordingly, as can be understood from the details shown in FIG. 4, the contactless force coupling arrangement adapted to transfer the actuating force from the presetting mechanism actuating device 3 to the pilot valve device 2 works as follows: the actuator element 17 present in the presetting mechanism actuating device 3 is switched on. Then, the actuator element 17 creates the actuating force in order to actuate the presetting mechanism in the pilot valve device 2 so as to preset the opening pressure. The actuating force is transferred from the actuator element 17 to the axis 18. Thus, axis 18 and the cavity 19 at the first axis end start to rotate. The cavity 19 is adapted to house the first spindle end in order to transfer the actuating force to the presetting mechanism. To allow this, the first permanent magnet 20 and the second permanent magnet 21 by their magnetic fields bridge the air gap 22a, 22b. Due to that the rotational torque of axis 18 can be transferred to the spindle 10. As spindle 10 starts to rotate nut 11 starts to move along the spindle 10 due to the nut 11 being held at the spindle 10 via the threading and the presence of nose 24 present at nut 11. Nut 11 being drivable by means of the actuating force along the spindle 10 will then compress spring 12, thus pretension it, and the second spring end being seated adjacent to the membrane will bias the membrane towards the pilot valve seat 14. Thus, the presetting mechanism actuating device 3 is adapted to preset the opening pressure of the pilot valve device 2.

Another feature of the embodiment of the invention as shown in FIG. 4 is that the contactless force coupling arrangement is hermetically sealed on the side of the pilot valve device 2. To achieve this, a presetting mechanism housing 25 is present which shields the spindle 10 and the first permanent magnet 20 from the cavity 19. Thus, in case the screws 8a, 8b are removed and the presetting mechanism actuating device 3 is taken off the pilot valve device 2, the presetting mechanism housing 25 shields the presetting mechanism from the environment and vice versa. Thus, maintenance and safety can be improved. As can be seen, a wall of the presetting mechanism housing 25 for this reason separates the air gap 22a, 22b in two parts, one between the cavity 19 and the presetting mechanism housing 25 and one between the presetting mechanism housing 25 and the first spindle end carrying the first permanent magnet 20.

Figure 5:
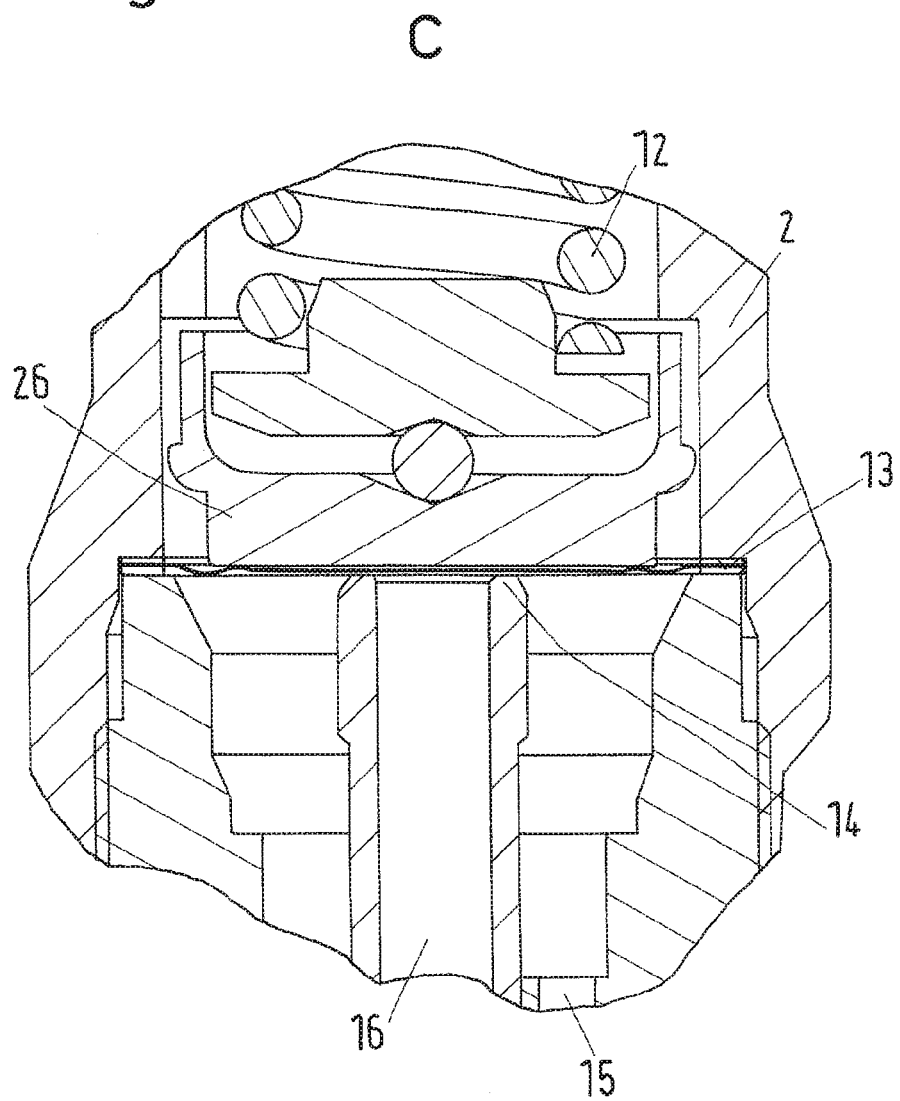
FIG. 5 shows a detailed view of the pilot valve element and the pilot valve seating in an embodiment of the pilot valve arrangement according to the invention.

FIG. 5 shows in more detail the pilot valve element 13 and the pilot valve seat 14 according to the given embodiment of the inventive pilot valve arrangement 1. As can be seen, spring 12 has the second spring end being seated adjacent to the membrane but not directly on the membrane. Instead, an intermediate element 26 is provided which is interposed between the spring 12 and the pilot valve element 13, in this case, the double membrane. The intermediate element 26 ensures an even distribution of the force exerted by the spring 12. When the pilot fluid enters the pilot valve device 2 through the pilot fluid inlet 15 it is first blocked by the pilot valve element 13 as it is biases so as to keep the pilot valve element 13 in contact with the pilot valve seat 14. When the pilot fluid surpasses the preset opening pressure determined by the presetting mechanism actuating device 3 the pilot valve element 13 lifts from the pilot valve seat 14 and the pilot fluid, for example a refrigerant, can pass the pilot valve element 13 and through the pilot fluid outlet 16. This way the pilot fluid may pass to a main valve device 27 when the pilot valve device 2 is connected to the main valve device 27 such as to control the opening of the main valve device by supplying the pilot fluid.

Figure 6:
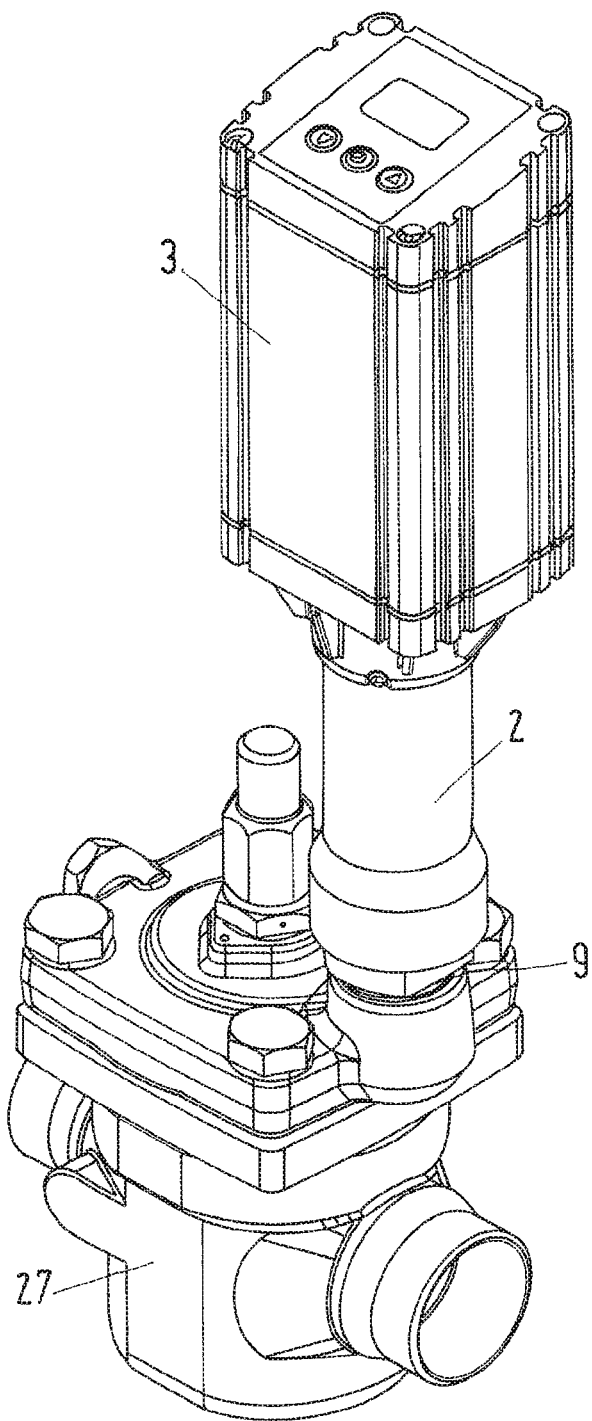
FIG. 6 shows a perspective view of the pilot valve arrangement according to an embodiment of the invention connected to a main valve device.

FIG. 6 shows such a situation. The pilot valve device 2 is connected to the main valve device 27 by the main valve connection arrangement 9. The pilot valve arrangement 1 then works in the following manner: the opening pressure of the pilot valve device 2 determines at which pressure the main valve device 27 opens. The opening pressure, as explained earlier, is determined by the pressure difference over the double membrane at a lower part of the pilot valve device 2 and the force exerted by the spring 12. The pilot fluid, for example the refrigerant, enters the pilot valve device 2 via the pilot fluid inlet 15 and exerts an upwards force, which is counteracted by the force exerted by the spring 12 and the pressure in the pilot valve device 2 above the spring 12. When the pressure below the pilot valve element 13, thus the double membrane, becomes sufficiently high, it will displace the pilot valve element 13 from the pilot valve seat 14 and the pilot valve device 2 will open, which in turn will cause the main valve device 27 to open. As explained before, the force exerted by the spring 12 and thus the biasing of the pilot valve element 13 towards the pilot valve seat 14 is adjusted by rotation of the spindle 10 which displaces the nut 11 that again will compress or decompress the spring 12 depending on the directional movement of the nut 11.

As will be understood, the FIGS. 1 to 6 also show the pilot valve device 2 in which the presetting mechanism is adapted to receive the actuating force via the contactless force coupling arrangement according to the invention.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A pilot valve arrangement comprising:
   a pilot valve device which comprises a pilot valve element, a pilot valve seat cooperating with the pilot valve element, and a presetting mechanism for presetting an opening pressure of the pilot valve element; the pilot valve arrangement further comprising
   a presetting mechanism actuating device which comprises an actuator element adapted to create an actuating force in order to actuate the presetting mechanism in the pilot valve device so as to preset the opening pressure, wherein the pilot valve arrangement comprises a contactless force coupling arrangement adapted to transfer the actuating force from the presetting mechanism actuating device to the pilot valve device,
   wherein the pilot valve device comprises a main valve connection arrangement configured to connect the pilot valve device to a valve top plate of a main valve device.

2. The pilot valve arrangement according to claim 1, wherein the actuating force is a torque and the contactless force coupling arrangement comprises cooperating magnets in order to transfer the torque over an air gap.

3. The pilot valve arrangement according to claim 1, wherein the presetting mechanism actuating device comprises a rotatable axis drivable by the actuator element, the presetting mechanism comprises a rotatable spindle drivable by the rotatable axis, and the contactless force coupling arrangement is adapted to transfer the actuating force from the rotatable axis to the spindle so as to rotate the spindle in order to actuate the presetting mechanism.

4. The pilot valve arrangement according to claim 3, wherein the spindle comprises a first spindle end and the axis provides a cavity adapted to house the first spindle end in order to transfer the actuating force from the actuator element to the presetting mechanism via the contactless force coupling arrangement.

5. The pilot valve arrangement according to claim 4, wherein the first spindle end comprises one or more spindle magnets being rotationally fixed relative to the spindle, the axis comprises a first axis end, the first axis end comprises one or more axis magnets being rotationally fixed relative to the axis, the one or more spindle magnets each being a first permanent magnet and the one or more axis magnets each being a second permanent magnet, the first permanent magnet and the second permanent magnet together being cooperating magnets in order to exert a magnetic force on each other so as to allow the axis to rotate the spindle.

6. The pilot valve arrangement according to claim 5, wherein the pilot valve device comprises a bearing in order to facilitate rotation of the spindle magnet.

7. The pilot valve arrangement according to claim 1, wherein the pilot valve element is a membrane, the membrane being biased so as to keep the pilot valve element in contact with the pilot valve seat, the presetting mechanism influencing the biasing of the membrane by means of the actuating force and by this presetting the opening pressure.

8. The pilot valve arrangement according to claim 7, wherein the presetting mechanism further comprises a nut, the nut being drivable by means of the actuating force, and a spring, the spring biasing the membrane, and the nut being adapted to pretension the spring depending on a position of the nut.

9. The pilot valve arrangement according to claim 8, wherein the spring is a coil spring and the spring comprises a first spring end and a second spring end, the first spring end being seated on the nut and the second spring end being seated adjacent to the membrane.

10. The pilot valve arrangement according to claim 1, wherein the actuator element is a motor.

11. The pilot valve arrangement according to claim 1, wherein the pilot valve device and the presetting mechanism actuating device comprise a fixing arrangement for fixing the pilot valve device and the presetting mechanism actuating device to each other.

12. The pilot valve arrangement according to claim 1, wherein the contactless force coupling arrangement is hermetically sealed on the side of the pilot valve device.

13. The pilot valve arrangement according to claim 1, wherein the pilot valve device comprises a pilot fluid inlet and a pilot fluid outlet, the pilot valve device being configured to control the opening of the main valve device by supplying a pilot fluid to the main valve device passing the pilot valve element and through the pilot fluid outlet.

14. A pilot valve device comprising a pilot valve element, a pilot valve seat cooperating with the pilot valve element, a presetting mechanism for presetting an opening pressure of the pilot valve element, and a main valve connection arrangement configured to connect the pilot valve device to a valve top plate of a main valve device, wherein the presetting mechanism is adapted to receive an actuating force via a contactless force coupling arrangement.

15. The pilot valve arrangement according to claim 2, wherein the presetting mechanism actuating device comprises a rotatable axis drivable by the actuator element, the presetting mechanism comprises a rotatable spindle drivable by the axis, and the contactless force coupling arrangement is adapted to transfer the actuating force from the axis to the spindle so as to rotate the spindle in order to actuate the presetting mechanism.

16. The pilot valve arrangement according to claim 2, wherein the pilot valve element is a membrane, the membrane being biased so as to keep the pilot valve element in contact with the pilot valve seat, the presetting mechanism influencing the biasing of the membrane by means of the actuating force and by this presetting the opening pressure.

17. The pilot valve arrangement according to claim 3, wherein the pilot valve element is a membrane, the membrane being biased so as to keep the pilot valve element in contact with the pilot valve seat, the presetting mechanism influencing the biasing of the membrane by means of the actuating force and by this presetting the opening pressure.

18. The pilot valve arrangement according to claim 4, wherein the pilot valve element is a membrane, the membrane being biased so as to keep the pilot valve element in contact with the pilot valve seat, the presetting mechanism influencing the biasing of the membrane by means of the actuating force and by this presetting the opening pressure.

19. The pilot valve arrangement according to claim 5, wherein the pilot valve element is a membrane, the membrane being biased so as to keep the pilot valve element in contact with the pilot valve seat, the presetting mechanism influencing the biasing of the membrane by means of the actuating force and by this presetting the opening pressure.

20. The pilot valve arrangement according to claim 6, wherein the pilot valve element is a membrane, the membrane being biased so as to keep the pilot valve element in contact with the pilot valve seat, the presetting mechanism influencing the biasing of the membrane by means of the actuating force and by this presetting the opening pressure.

* * * * *